United States Patent [19]

Spisak

[11] Patent Number: 4,641,744
[45] Date of Patent: Feb. 10, 1987

[54] CONVEYOR CHAIN ADJUSTMENT MEANS
[75] Inventor: Anthony F. Spisak, Redford, Mich.
[73] Assignee: Ex-Cell-O Corporation, Troy, Mich.
[21] Appl. No.: 746,683
[22] Filed: Aug. 12, 1985
[51] Int. Cl.[4] .............................................. B65G 23/44
[52] U.S. Cl. ..................................................... 198/813
[58] Field of Search .............. 198/813, 570, 575, 435, 198/583, 584, 586, 816, 627; 474/113; 74/384, 397

[56] References Cited

U.S. PATENT DOCUMENTS

| 1,048,621 | 12/1912 | Williams | 198/627 |
| 1,076,726 | 10/1913 | Welch | 198/627 |
| 1,531,847 | 3/1925 | Danforth et al. | 198/800 |
| 1,785,141 | 12/1930 | Morton | 198/816 |
| 4,346,803 | 8/1982 | Haessler et al. | 198/813 |

Primary Examiner—Joseph E. Valenza
Assistant Examiner—Kyle E. Shane
Attorney, Agent, or Firm—John P. Moran

[57] ABSTRACT

A chain adjustment arrangement including a drive gear having a fixed axis, an idler gear having a movable axis, and a driven gear having a movable axis, a first rigid link mounted between the axes of the drive gear and the idler gear, and a second rigid link mounted between the axes of the idler gear and the driven gear. The first and second links serve to maintain the idler gear in engagement between the drive gear and the driven gear upon manual movement of the driven gear to take up stretch in the conveyor chain.

2 Claims, 2 Drawing Figures

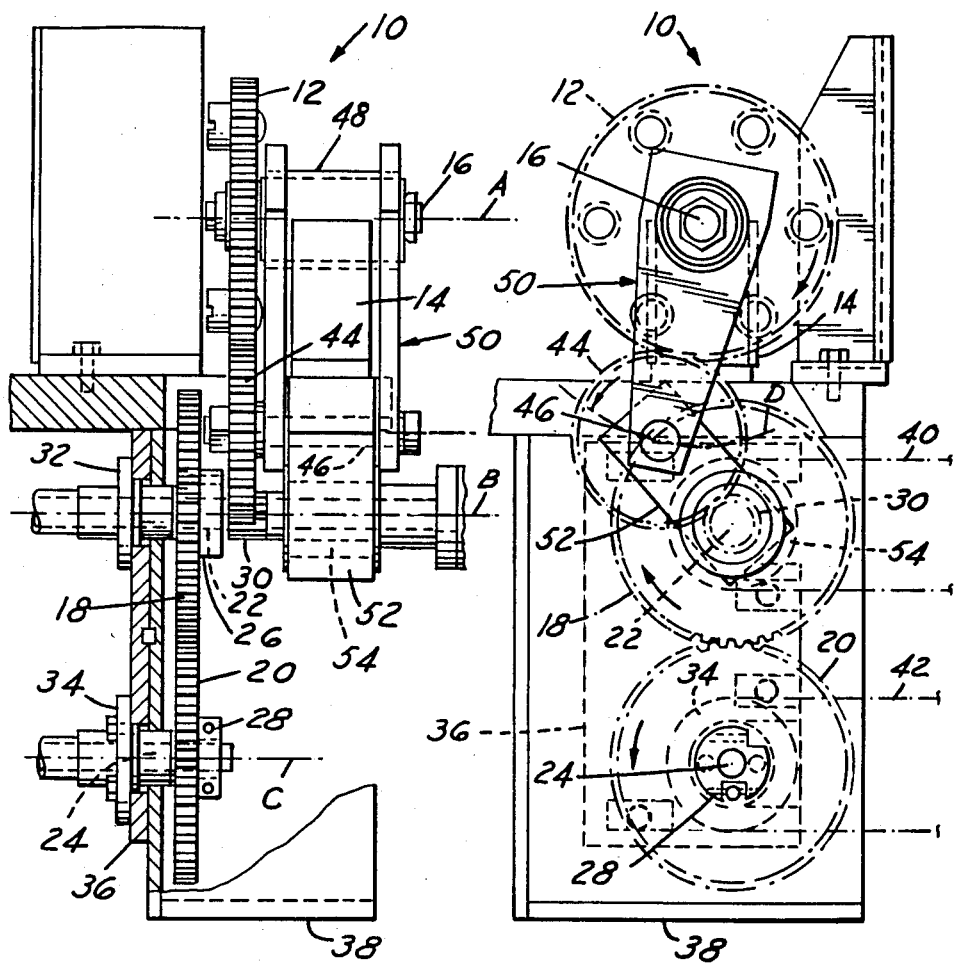

4,641,744

CONVEYOR CHAIN ADJUSTMENT MEANS

TECHNICAL FIELD

This invention relates generally to chain adjustment means and, more specifically, to chain adjustment means utilizing a pair of links to maintain an idler gear in engagement between and with a fixed driving member and a movable driven member actuating a pulley and chain upon manually moving the driven member and pulley to take up stretch in the chain.

BACKGROUND ART

Heretofore, conveyor chain stretch has generally been taken up at the conveyor idler end, rather than at its drive end. However, in those application wherein the conveyor idler end has been functionally critical, stretch take-up is typically accomplished either by incorporating an auxiliary device or by re-setting the drive mechanism.

DISCLOSURE OF THE INVENTION

An object of the invention is to provide an improved conveyor chain stretch take-up arrangement wherein the take-up occurs at the drive end of the conveyor without disrupting the drive mechanism.

Another object of the invention is to provide a conveyor chain stretch take-up arrangement wherein connector means are provided, operatively connecting the idler gear intermediate the drive gear and to a chain sprocket in such a way that the stretch taken up by moving the chain sprocket is automatically compensated for while retaining the idler gear in its intermediate engagement.

A further object of the invention is to provide a conveyor chain stretch take-up arrangement, including an idler gear operatively connected intermediate a conveyor chain sprocket and a drive gear, a first link connected between the shafts of the sprocket and the idler gear, and a second link connected between the shafts of the idler gear and the drive gear, the links serving to cause the shaft of the idler gear to move in arc while maintaining its intermediate engagement upon moving the sprocket to take up the stretch and maintaining the axial position of the drive gear.

BRIEF DESCRIPTION OF THE DRAWINGS

FIG. 1 is a side elevational view of a conveyor chain stretch take-up arrangement embodying the invention; and FIG. 2 is an end view of the FIG. 1 arrangement.

BEST MODE OF CARRYING OUT THE INVENTION

Referring now to the drawings in greater detail, FIGS. 1 and 2 illustrate a conveyor chain adjustment arrangement 10 including a peripherally toothed dial plate or drive gear 12 operatively connected to a fixed bracket 14. The drive gear 12 is mounted on a shaft 16 having a fixed axis A (FIG. 2). A pair of meshing conveyor chain drive gears 18 and 20 are mounted on respective shafts 22 and 24 retained by locking collars 26 and 28 respectively rotatably mounted in suitable bushings (not shown) having movable axes B and C. A toothed member 30 is secured to the shaft 22. A pair of sprockets 32 and 34 are also mounted on the respective shafts 22 and 24 for rotation with the gears 18 and 20. The shafts 22 and 24 are rotatably mounted on a bracket 36 which is adjustably mounted on an external member, such as a machine base, represented as 38 in FIG. 2. Conveyor chains 40 and 42 are mounted around the respective sprockets 32 and 34.

An idler gear 44 is mounted on a shaft 46 and meshes with both the drive gear 12 and the toothed member 30. A spacer 48 separates a pair of first links 50, each loosely mounted at one end thereof to the shaft 16 and at the other end thereof to the shaft 46. A second link 52 is loosely mounted at one end thereof on the shaft 46 intermediate the pair of links 50, and at the other end thereof around the extension 54 of the toothed member 30 on the shaft 22.

In operation, conveyor setup or adjustment is accomplished by relocating the bracket 36 at the drive end of the conveyor on the base member 38. Once the bracket 36 is fastened, the links 50 and 52 form a rigid body, and regardless of the location of the bracket 36, constant gear center distances are maintained. The reactions of the links 50 and 52 to movement of the bracket 36 to the right in FIG. 1 and, hence, to the axial movement of the shafts 22 and 24 to take up stretch in the conveyor chains 40 and 42, is to cause the shaft 46 of the idler gear 44 to be pulled by the link 52 along an arc represented at D (FIG. 1) as a result of the counterclockwise rotation of the link 50 about the fixed axis A of the drive gear 12. The idler gear 44 thus remains in engagement between the toothed member 30 and the drive gear 12.

INDUSTRIAL APPLICABILITY

It is apparent that chain take up adjustment is accomplished by means of adjusting the conveyor drive end in the direction of chain stretch, in contrast to adjusting chain stretch at the conveyor idler end, or utilizing an auxiliary take up mechanism, or re-setting the drive gear.

It is also apparent that first and second links serve to move the usual idler gear as required, in response to movement of a conveyor drive end, while maintaining the idler gear in engagement between the movable conveyor drive end and a fixed axis drive gear.

While but one embodiment of the invention has been shown and described, other modifications thereof are possible within the scope of the following claims.

The embodiments of the invention in which an exclusive property or privilege is claimed are defined as follows:

1. A chain adjustment arrangement comprising a fixed drive shaft, an adjustable mounting bracket, a pair of shafts rotatably mounted on said bracket, a drive gear mounted on said fixed drive shaft, a pair of meshing chain drive gears mounted on said respective shafts, a chain drive sprocket mounted on each of said pair of shafts, a conveyor chain mounted around each of said drive sprockets, a toothed member mounted on one of said pair of shafts, an idler shaft, an idler gear mounted on said idler shaft and in engagement with said drive gear and toothed member, a first link connected at its opposite ends to said drive shaft and said idler shaft, and a second link connected at its opposite ends to said idler shaft and said one of said pair of shafts, said links retaining said idler gear in engagement between said drive gear and toothed member upon movement of said mounting bracket to take up stretch in said conveyor chains.

2. The chain adjustment arrangement described in claim 1, wherein said adjustment of said mounting bracket is in a sideward direction as opposed to being moved toward or away from said fixed drive shaft.

* * * * *